United States Patent [19] [11] 3,763,310

Sagishima et al. [45] Oct. 2, 1973

[54] REFERENCE SIGNAL INDICATING APPARATUS FOR A TINT-ADJUSTING IN COLOR TELEVISION RECEIVERS

[75] Inventors: Takayuki Sagishima; Michio Furuhasi; Reiichi Sasaki, all of Osaka, Japan

[73] Assignee: Matsushita Electric Industrial Co., Ltd., Osaka, Japan

[22] Filed: May 22, 1972

[21] Appl. No.: 255,275

[30] Foreign Application Priority Data

May 24, 1971 Japan .............................. 46/35675

[52] U.S. Cl. .......................... 178/5.4 TE, 178/5.4 R

[51] Int. Cl. ............................................ H04n 9/12

[58] Field of Search .................... 178/5.4 R, 5.4 HE, 178/5.4 AC, 5.4 TE

[56] References Cited

UNITED STATES PATENTS 2,858,368 10/1958 Kennedy ........................ 178/5.4 TE

*Primary Examiner*—Richard Murray
*Attorney*—E. F. Wenderoth et al.

[57] ABSTRACT

A reference signal indicating apparatus for a tint-adjusting in a color television receiver, said apparatus indicating a reference signal on a television screen for a tint-adjusting whenever viewers want to adjust the tint of color television receiver. This apparatus inserts a pulsed sine wave, having a phase and a frequency identical to those of the color burst signal, into carrier chrominance signals during appropriate period in scanning intervals and displays only red color difference (R–Y) output signals on the television screen during the period. A portion on the screen according to the period has two kinds of hues, one of which changes according to the tint-adjuting. When the portion on the screen has the same hue, the tint-adjusting is correct.

5 Claims, 17 Drawing Figures

REFERENCE SIGNAL INDICATING APPARATUS FOR A TINT-ADJUSTING IN COLOR TELEVISION RECEIVERS

The present invention relates to an indicating apparatus of a reference signal on a television screen for making it easy to adjust the tint of a color television receiver.

DESCRIPTION OF THE PRIOR ART

Viewers adjust the tint of a color television receiver generally on the basis of flesh tone of pictures on the screen. After their adjusting, they are still anxious about the result of their tint-adjusting. Moreover, when they find no person on the screen and they find no flesh tone of bared skin or their memory color on the television screen, they sometimes doubt the tint of pictures they are looking at. Then, even if the tint is not correct and they know the fact, they can't adjust the tint correctly because they have no reference.

SUMMARY OF THE INVENTION

It is an object of this invention to provide an indicating apparatus of a reference signal that indicates tint-adjusting condition of a color television receiver.

It is another object of this invention to provide an indicating apparatus that gives a reference and enables unskilled viewers to adjust tint easily whenever they want to.

To achieve the foregoing objects, a reference signal indicating apparatus for a tint-adjusting in a color television receiver according to the present invention comprises:reference signal inserting means coupled to a first chroma amplifier in a color television receiver for inserting reference signals consisting of pulsed sine wave signals, having a phase and a frequency identical to those of the color burst signals and intervals without signals, into carrier chrominance signals during indicating intervals of the reference signals; luminance switching means located between video amplifiers for making the level of video signals constant during the indicating intervals; chroma switching means coupled to a color demodulator for making the level of (G–Y) and (B–Y) color difference signals constant during the indicating intervals of the reference signals; and pulse generating means for generating pulse signals to control said reference signal inserting means, said luminance switching means and said chroma switching means.

DESCRIPTION OF THE DRAWING

These and other features of the invention will be apparent from the following description of the invention taken in connection with the accompanying drawings, in which:

FIG. 3(2) is a graph showing burst gate pulses;

FIG. 3(3) is a graph showing pulse signals $P_1$ of a pulse generator in the block diagram of FIG. 2;

FIG. 3(4) is a graph showing pulse signals $P_4$ of the pulse generator in the block diagram of FIG. 2;

FIG. 3(5) is a graph showing pulse signals $P_2$ of the pulse generator in the block diagram of FIG. 2;

FIG. 3(6) is a graph showing pulse signals $P_3$ of the pulse generator in the block diagram of FIG. 2;

FIG. 3(7) is a graph showing video signals of the first video amplifier in the block diagram of FIG. 2;

FIG. 3(8) is a graph showing carrier chrominance signals of a first chroma amplifier in the block diagram of FIG. 2;

FIG. 3(9) is a graph showing continuous sine wave signals of a subcarrier generator in the block diagram of FIG. 2;

FIG. 3(10) is a graph showing pulsed sine wave signals of an analog gate D in the block diagram of FIG. 2;

FIG. 3(11) is a graph showing carrier chrominance signals with reference signals of an analog gate E in the block diagram of FIG. 2;

FIG. 3(12) is a graph showing (R–Y) output signals of a color demodulator in the block diagram of FIG. 2;

FIG. 3(13) is a graph showing output signals of an analog gate B in the block diagram of FIG. 2;

FIG. 3(14) is a graph showing output signals of a third video amplifier in the block diagram of FIG. 2.

DESCRIPTION OF PREFERRED EMBODIMENTS

Figure 1:
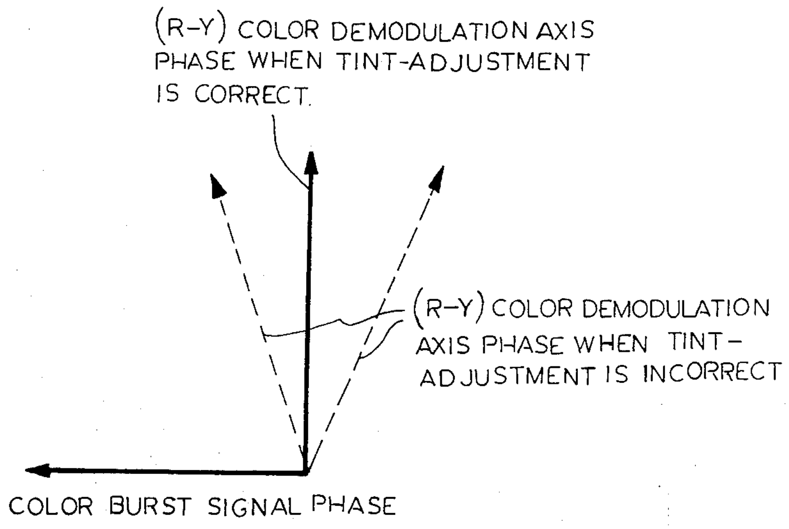
FIG. 1 is a vector diagram showing the phase relationship between the color burst signal phase and (R-Y) color demodulation axis phase in color television receivers.

In the NTSC system, the color burst signals have 90° phase with respect to the red color difference (R–Y) axis, In a color television receiver, when tint-adjustment is correct, (R–Y) color demodulaiton axis has 90° phase with respect to the color burst signal phase as indicated by solid lines in FIG. 1. Therefore, (R–Y) color demodulation axis component of carrier chrominance signals, having the same phase as that of the color burst signal, is zero. But when tint-adjustment is incorrect and the (R–Y) color demodulation axis does not have 90° phase with respect to the phase of the color burst signal, as shown by dotted lines in FIG. 1, (R–Y) color demodulation axis component of the carrier chrominance signals, having the same phase as that of the color burst signal, is zero. This invention is based on the above fact.

Figure 2:
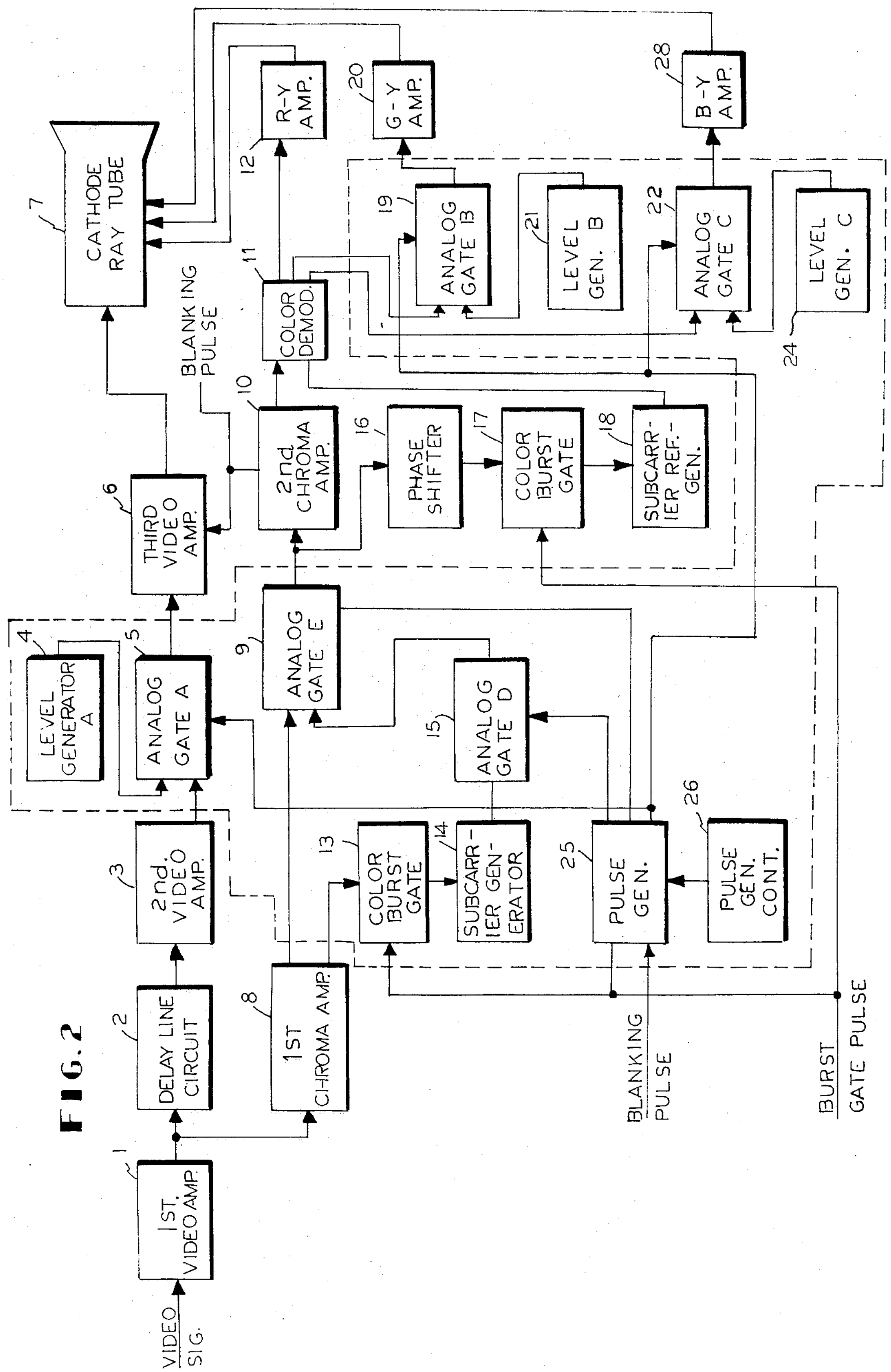
FIG. 2 is a block diagram of an embodiment of the reference signal indicating apparatus for a tint-adjusting in accordance with the present invention.
Figure 3:
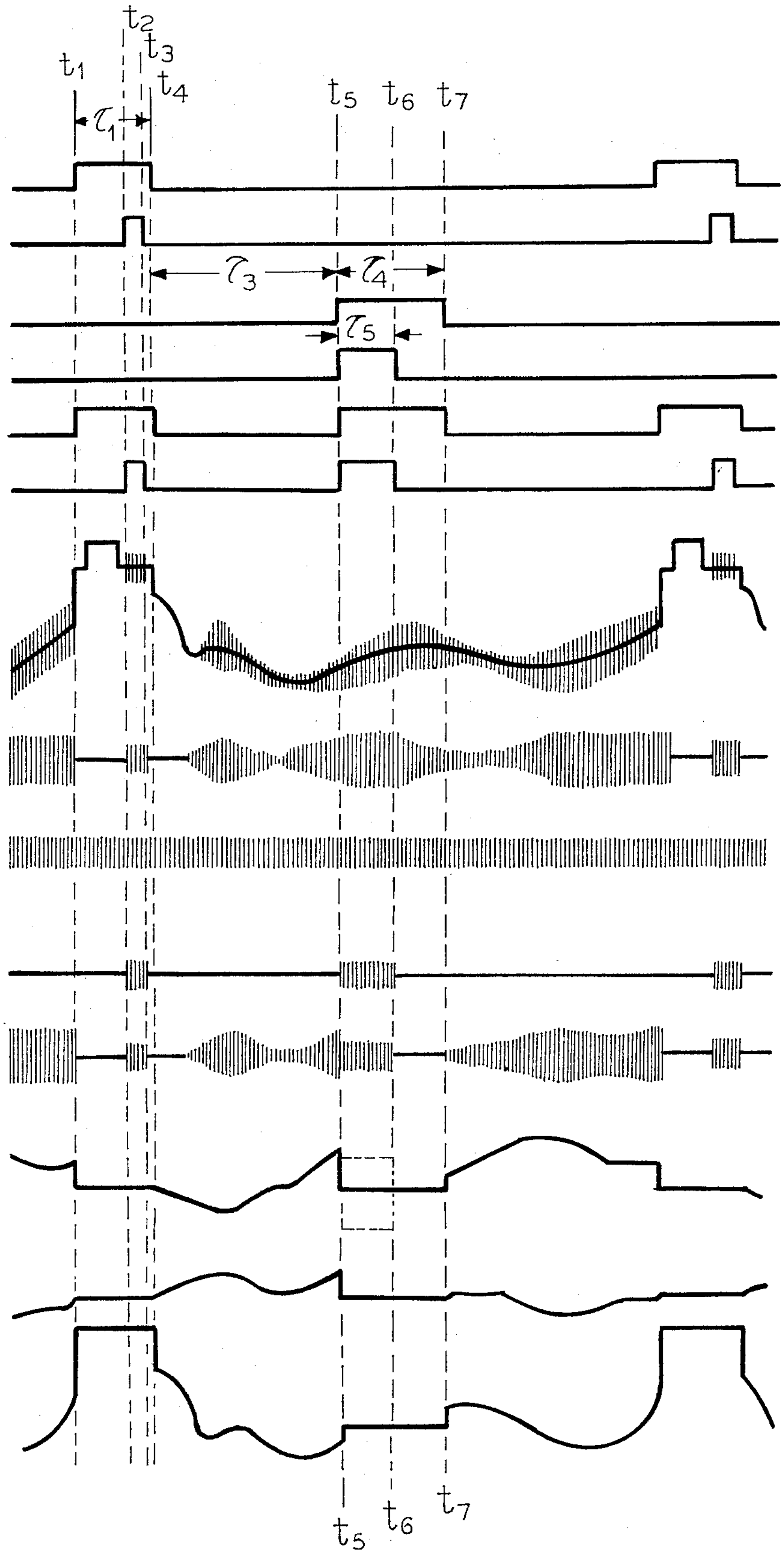
FIG. 3(1) is a graph showing blanking pulse signals in one horizontal scanning interval.

Thurning now to FIG. 2, there is shown a block diagram of an embodiment of the reference signal indicating apparatus for a tint-adjusting, wherein the part surrounded by the dotted line is the novel apparatus in accordance with the present invention. A first chroma amplifier 8 connected to a first video amplifier 1 extracts carrier chrominance signals as shown in FIG. 3(8) from output video signals of the first video amplifier (1), as shown in FIG. 3(7). A color burst gate 13 in FIG. 2 extracts the color burst signals from said carrier chrominance signals. A subcafrier generator 14 connected to said burst gate 13 generates continuous sine wave signals having a frequency and a phase identical to those of the color burst signals as shown in FIG. 3(9).

Meanwhile, a pulse generator 25 in FIG. 2 generates three kinds of pulse signals $P_1$, $P_2$ and $P_3$ as shown in FIG. 3(3), 3(5) and 3(6). The pulse signals $P_1$ have their leading edges at tine $t_5$, pulse width $\tau_4$ and trailing edges at tine $t_7$, where time $t_5$ is located between horizontal blanking pulses and at the end of the time interval $\tau_3$ which starts from trailing edges of the horizontal blanking pulses at time $t_4$. The horizontal blanking pulses have their leading edges at time $t_1$ and pulse width $\tau_1$ as shown in FIG. 3(1). The pulse signals $P_2$ are sum of the horizontal blanking pulses and the pulse signals $P_1$. The pulse signals $P_3$ are sum of the burst gate pulses and pulse signals $P_4$. The burst gate pulses have their leading edges at time $t_2$ and trailing edges at time $t_3$ as shown in FIG. 3(2). The pulse signals $P_4$ have their edges at time $t_5$ pulse width $\tau_5$, and trailing edges at time $t_6$, where the time $t_6$ is located between the time $t_5$ and the time $t_7$. An analog gate D (15) in FIG. 2 extracts subcarrier signals from the continuous sine wave signals of the subcarrier generator (14) during the time interval $t_2$–$t_3$ and the time interval $t_5$–$t_6$, using the pulse signals $P_3$. Output signals of the analog gate D(15) are pulsed sine wave signals, as shown in FIG. 3 (10). An analog gate E (9) passes the pulsed sine wave signals of the analog gate D (15) during the time interval $t_1$–$t_4$ and the time interval $t_5$–$t_7$, and during the other time interval, passes carrier chrominance signals of the first chroma amplifier 8, using the pulse signals $P_2$. Output signals of the analog gate E (9) in FIG. 2 consist of color burst signals during the time interval $t_2$–$t_3$, receiving carrier chrominance signals during the time interval $t_4$–$t_5$, the pulsed sine wave signals having the frequency and the phase identical to those of the color burst signals during the time interval $t_5$–$t_6$, no signals during the time interval $t_6$–$t_7$, and receiving chrominance signals after time $t_7$, as shown in FIG. 3(11). signals output s8gnals of the analog gate E (9) are fed to a color burst gate 17 through a phase shifter 16 for tint-adjustment. The color burst gate 17 extracts only the color burst signals during the time interval $t_2$–$t_3$. A subcarrier reference generator 18 in FIG. 2 generates subcarrier reference signals locked to the color burst signals from the color burst gate 17. A second chroma amplifier 10 amplifies the carrier chrominance signals with reference signals during the time interval $t_5$–$t_7$ as indicated in FIG. 3 (11), and blanks them during blanking time interval $t_1$–$t_4$. A color demodulator 11 synchronously detects the output signals of the second chroma amplifier 10 with reference to the output signals of the subcarrier reference generator 18. A signal level during the time interval $t_5$–$t_6$ of (R–Y) output signals of the color demodulator 11 changes according to the tint-adjustment. When the tint-adjustment is correct and the (R–Y) demodulation axis of the color demodulator 11 has 90° phase with respect to the phase of the color burst signal, the signal level during the time interval $t_5$–$t_6$ is same as the signal level during the time interval $t_6$–$t_7$, as indicated by solid lines in FIG. 3(12). But when the tint-adjustment is incorrect and the (R–Y) demodulation axis does not have 90° phase with respect to the phase of the color burst signal, the signal level during the time interval $t_5$–$t_6$ is not same as the signal level during the time interval $t_6$–$t_7$, as indicated by dotted lines in FIG. 3(12). The (R–Y) output signals of the color demodulator 11 are amplified in a (R–Y) amplifier 12 and are fed to a cathode ray tube 7. (G–Y) output signals of the color demodulator 11 are fed to an analog gate B (19). The analog gate B (19) makes the level of the input (G–Y) signals constant, the level being determined by a level generator 21, during the time interval $t_5$–$t_7$, using the pulse signal $P_1$ from the pulse generator 25. Output signals of the analog gate B (19), as indicated in FIG. 3(13), are amplified in a (G–Y) amplifier 20 and are fed to the cathode ray tube 7. Similarly, (B–Y) output signals of the color demodulator 11 are fed to an analog gate C (22). The analog gate C (22) makes the level of input (B–Y) signals constant, the level being determined by a level generator 24, during the time interval $t_5$–$t_7$. Output signals of the analog gate C (22) are amplified in a (B–Y) amplifier 23 and are fed to the cathode ray tube 7.

Meanwhile, the output video signals of the first video amplifier 1 in FIG. 2 are fed to a second video amplifier 3 through a delay line circuit 2 for equalizing delay time difference between luminance signals and chrominance signals. Output signals amplified in the second amplifier 3 are fed to an analog gate A 5. The analog gate A 5 makes the level of the video signals constant, the level being determined by a level generator A (4), during the time interval $t_5$–$t_7$. Output signals of the analog gate A (5) are fed to a third video amplifier 6 and are amplified and are blanked during the blanking interval. Output video signals of the third video amplifier 6 are fed to the cathode ray tube 7. Input video signals of the cathode ray tube 7 are constant during the time interval $t_5$–$t_7$ as indicated in FIG. 3 (14).

On a screen of the cathode ray tube 7, only (R–Y) output signals are displayed during the time interval $t_5$–$t_7$. Hue on an area according to the time interval $t_5$–$t_6$ changes according to the tint-adjustment, and the hues of an area according to the time interval $t_5$–$t_7$ are same only when the tint-adjustment is correct and the (R–Y) demodulation axis has 90° phase with respect to the phase of the color burst signal Therefore viewers can achieve tint-adjustment correctly by way of making the hue of the area according to the time interval $t_5$–$t_7$ same. A pulse generator controller 26 allows the pulse generator 25 to generate the pulse signals $P_1$, $P_2$ and $P_3$ only when viewers want to adjust the tint. At the same time, the pulse generator controller 26 gets the pulse generator 25 to generate signals which causes the analog gates A, B, C and E to always transfer the output signals of the second video amplifier 3, the (G–Y) output signals of the color demodulator 11, the (B–Y) output signals of the color demodulator 11 and the output signals of the first chroma amplifier 8 to their output terminals, respectively. Therefore, color television receivers with this apparatus are in normal receiving condition when viewers do not want to adjust the tint.

Figure 4:
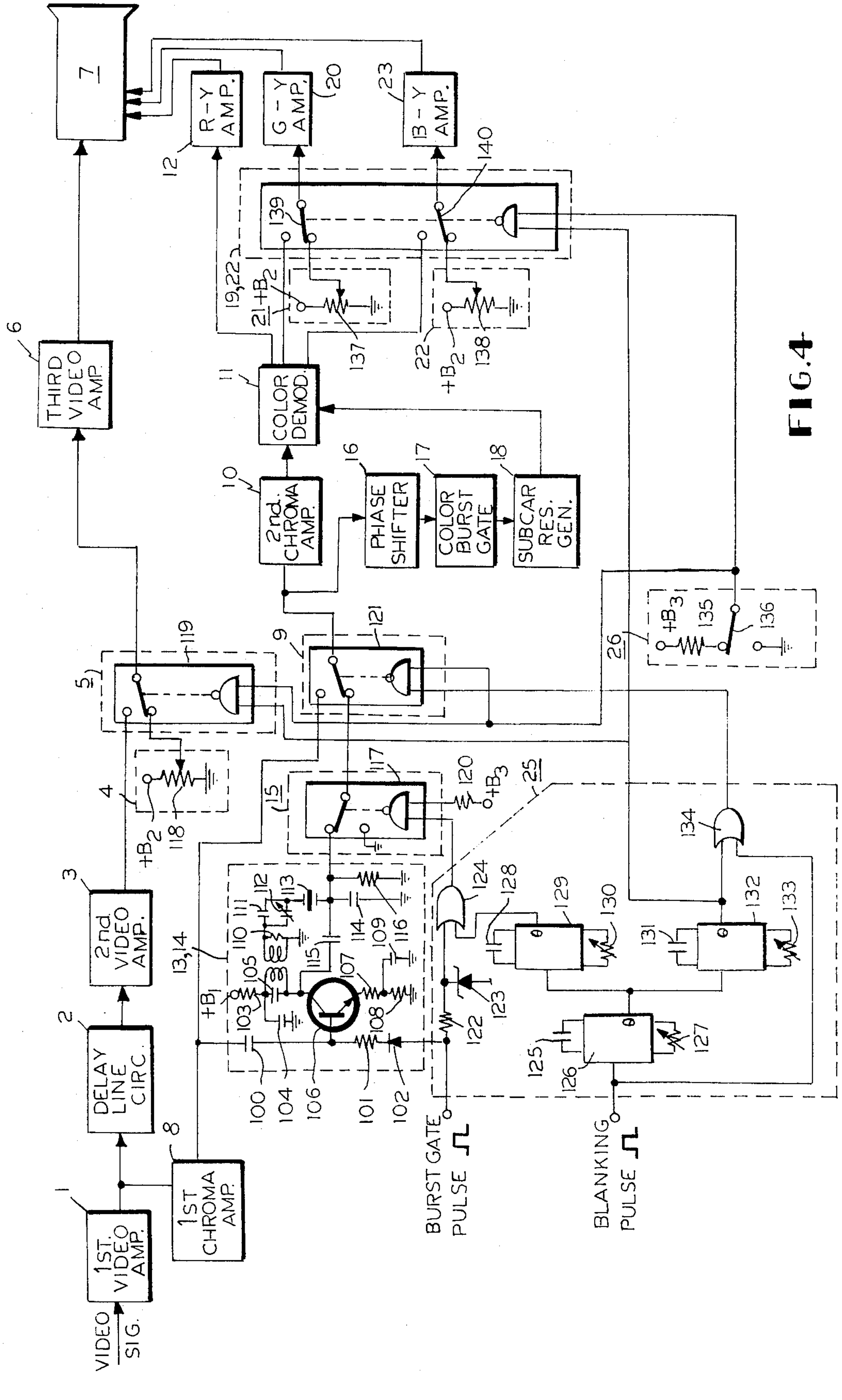
FIG. 4 is a schematic diagram of a practical embodiment of the apparatus shown in FIG. 2.

Referring to FIG. 4, there is shown a schematic diagram of a practical embodiment of the reference signal indicating apparatus for a tint-adjusting shown in FIG. 2. In FIG. 4, the blocks identical to those of FIG. 2 are indicated by the same reference numerals.

The output carrier chrominance signals of the first chrominance amplifier 8 are fed to a base of a transistor 106 with the burst gate pulse through a diode 102 and a resistor 101. The gated color burst signals are fed to a tuned circuit with a quartz crystal 113 tuned to the subcarrier frequency. The quartz crystal 113 rings at its resonant frequency in response to the subcarrier component of the gated color burst signals, and continuous subcarrier signals are delivered to one input terminal of an analog gate IC 117.

Meanwhile, the blanking pulse as indicated in FIG. 3(1) are fed to a monostable multivibrator IC (126). Output signals of the monostable multivibrator 126 are pulse signals which have their leading edges at time $t_4$, pulse width $\tau_3$, and trailing edges at time $t_5$. The pulse width $\tau_3$ is determined by the values of a resistor 127 and a capacitor 125. The output signals of the monostable multivibrator IC 126 are fed to two monostable multivibrator IC's 129 and 132, and trigger them with the trailing edges at time $t_5$. Output signals of the monostable multivibrator IC 129 are the pulse signals $P_4$, as shown in FIG. 3 (4). The pulse width $\tau_5$ of the pulse signals $P_4$ is determined by the values of a resistor 130 and a capacitor (128). Output signals of the monostable multivibrator IC 132 in FIG. 4 are the pulse signals $P_1$, as shown in FIG. 3(3). The pulse width $\tau_4$ is determined by the values of a resistor 133 and a capacitor 131. One of the input signals of an OR gate IC 124 is a color burst gate pulse limited by a resistor 122 and a zener diode 123. Output signals of the OR gate IC 124 are the pulse signals, $P_3$ as shown in FIG. 3(6). Output signals of an OR gate IC 134 are the pulse signals $P_2$, as shown in FIG. 3(5). The analog gate IC (117) passes the input continuous sine wave signals to one of the two input terminals of an analog gate IC 121 during the time interval $t_2$–$t_3$ and during the time interval $t_5$–$t_6$using the pulse signals $P_3$ of the OR gate IC 124. The analog gate IC 121 passes the output signals of the analog gate IC 117 during the time interval $t_1$–$t_4$ and during the time interval $t_5$–$t_7$, and during the other interval, the analog gate IC 121 passes the output signals of the first chroma amplifier 8 using the output pulse signals $P_2$ of the OR gate IC 134. The output signals of the analog gate IC 121 are fed to the second chroma amplifier 10. As described before, the color demodulator 11 detects output signals of the second chroma amplifier 10, using the reference subcarrier signals generated in the reference generator 18 and locked to the phase and frequency of the color burst signals fed through the phase shifter 16 for the tint-adjustment and the color burst gate 18. The (G–Y) output signals and the (B–Y) output signals of the color demodulator 11 are fed to analog gate IC's 139 and 140, respectively. The analog gate IC 139 makes the level of the (G–Y) output signals constant, the level being determined by an variable resistor 137, during the time interval $t_5 - t_7$ using the output pulse signals $P_1$ of the monostabel multivibrator IC 132. Similaly, the analog gate IC 140 makes the level of the (B–Y) output signals constant, the level being determined by a variable resistor 138, during the time interval $t_5 - t_7$. The hues of the area according to the time interval $t_5 - t_7$ on the screen of the cathode ray tube 7 can be changed by the constant levels determined by the variable resistors 137 and 138. The (R–Y) output signals of the color demodulator 11 are amplified in the (R–Y) amplifier 12 and are fed to the cathode ray tube 7. Modified (G–Y) and (B–Y) output signals of the analog gate IC's 139 and 140 are amplified in the (G–Y) and (B–Y) amplifiers respectively and are fed to the cathode ray tube 7.

The delayed video output signals of the first video amplifier 1 through the delay line circuit 2 are amplified in the second video amplifier 3. The video signals of the second video amplifier 3 are fed to an analog gate IC 119. The analog gate IC 119 makes the level of the video signals constant, the level being determined by a variable resistor 118, during the time interval $t_5 - t_7$, using the output pulse singals $P_1$ of the monostable multivibrator IC 132. Output signals of the analog gate IC 119 are amplified in the third video amplifier 6 and are fed to the cathode ray tube 7.

When a manual switch 136 is connected to the ground, the analog gate IC's 119, 121, 139 and 140 always pass the output signals of second video amplifier 3, the output signals of the first chroma amplifier 8, the (G–Y) output signals of the color demodulator 11 and the (B–Y) output signals of the color demodulator 11 to their outputs, respectively.

In the specific embodiment of FIG. 4, satisfactory results are obtained by employing the following specified components:

| | | |
|---|---|---|
| Capacitor | 100 | 270pF |
| Resistor | 101 | 47KΩ |
| Diode | 102 | OA90 |
| Resistor | 103 | 3.9KΩ |
| Capacitor | 104 | 0.047μF |
| Capacitor | 105 | 120pF |
| Transistor | 106 | 2SC829 |
| Resistor | 107 | 47Ω |
| Resistor | 108 | 2.2KΩ |
| Capacitor | 109 | 3.3μF/25V |
| Resistor | 110 | 330Ω |
| Capacitor | 111 | 12pF |
| Capacitor | 112 | 2–10pF |
| Quarz crystal | 113 | 616–6MEW |
| Capacitor | 114 | 39pF |
| Capacitor | 115 | 1pF |
| Resistor | 116 | 1.8KΩ |
| Analog gate IC | 117 | NH0014 |
| Variable resistor | 118 | 5KΩ |
| Analog gate IC | 119 | NH0014 |
| Resistor | 120 | 1KΩ |
| Analog gate IC | 121 | NH0014 |
| Resistor | 122 | 15KΩ |
| Zener diode | 123 | RD5A |
| OR gate IC | 124 | SN5432 |
| Capacitor | 125 | 1000pF |
| Monostable multivibrator IC | 126 | SN74121 |
| Resistor | 127 | 10–20KΩ |
| Capacitor | 128 | 480pF |
| Monostable multivibrator IC | 129 | SN74122 |
| Resistor | 130 | 20–50KΩ |
| Capacitor | 131 | 680pF |
| Monomultivibrator IC | 132 | SN74122 |
| Resistor | 133 | 20–50KΩ |
| OR gate IC | 134 | SN532 |
| Resistor | 135 | 1KΩ |
| Variable resistor | 137 | 5KΩ |
| Variable resistor | 138 | 5KΩ |
| Analog gate | 139 | NH0014 |
| Analog gate | 140 | NH0014 |
| Supply voltage | $B_1$ | 24V |
| Supply voltage | $B_2$ | 10V |
| Supply voltage | $B_3$ | 5V |

Thus, the present invention provides a new and improved reference signal indicating apparatus for a tint-adjusting in a color television receiver. And viewers can adjust the tint of a color television receiver correctly, easily and quickly whenever they want to, by means of this reference signal indicating apparatus for a tint-adjusting.

While a few ambodiments of the invention have been illustrated and described in detail hereinbefore, it should be understood that the present invention is not limited by the embodiments, and that minor modifications of the embodiments are included in the scope of the present invention.

What is claimed is:

1. A reference signal indicating apparatus for a tint-adjusting in a color television receiver having a first chroma amplifier, video amplifiers and a color demodulator, said apparatus comprising: reference signal inserting means coupled to the first chroma amplifier for inserting reference signals into carrier chrominance signals during indicating intervals of the reference signals, said reference signals consisting of interval without signals and pulsed sine wave signals having a phase and a frequency identical to those of the color burst signals; luminance switching means located between the video amplifiers for making the level of video signals constant during the indicating intervals; chroma switching means coupled to a color demodulator for making the level of (G–Y) and (B–Y) color difference signals constant during the indicating intervals of the reference signals; and pulse generating means for generating pulse signals to control said reference signal inserting means, said luminance switching means and said chroma switching means.

2. A reference signal indicating apparatus for a tint-adjusting in a color television receiver as claimed in claim 1, wherein said reference signal inserting means comprises: a color burst gate coupled to said first chroma amplifier for extracting the color burst signals from carrier chrominance signals; a subcarrier generator coupled to said color burst gate for generating continuous sine wave signals having the phase and the frequency identical to those of said color burst signals; an analog gate coupled to said subcarrier generator for extracting sine wave signals from said continuous sine wave signals during an appropriate interval; and a further analog gate coupled to said analog gate for passing output signals of said analog gate instead of carrier chrominance signals during the indicating interval of the reference signals.

3. A reference signal indicating apparatus for a tint-adjusting in a color television receiver as claimed in claim 1, wherein said chroma switching means comprises: an analog gate coupled to said color demodulator for making the level of (G–Y) color difference signals constant during the indicating interval of the reference signals; a level generator coupled to said analog gate for generating said constant level in the (G–Y) color difference signals; a further analog gate coupled to said color demodulator for making the level of (B–Y) color difference signals constant during said indicating interval of the reference signals, and a leverl generator coupled to said further analog gate for generating the constant level in the (B–Y) colora difference signals.

4. A reference signal indicating apparatus for a tint-adjusting in a color television receiver as claimed in claim 1, wherein said luminance switching means comprises: an analog gate coupled to said video amplifier for making the level of the video signals constant during said indicating interval of the reference signals; and a level generator coupled to said analog gate for generating said constant level.

5. A reference signal indicating apparatus for a tint-adjusting in a color television receiver as claimed in claim 1, wherein said pulse generating means comprises: a pulse generator for generating pulse signals to control said reference signal inserting means, said luminance switching means and said chroma switching means; and a pulse generator controller coupled to said pulse generator for controlling said pulse generator so that said reference signals are indicated on the television screen only when a viewer wants to adjust the tint of the color television receiver.

* * * * *